3,256,231
POLYMERIC WATER AND OIL REPELLENTS
Rulon Edward Johnson, Jr., Newark, and Stuart Raynolds, Wilmington, Del., assignors to E. I. du Pont de Nemours and Company, Wilmington, Del., a corporation of Delaware
No Drawing. Filed May 3, 1961, Ser. No. 107,342
5 Claims. (Cl. 260—29.6)

This invention is directed to the preparation and use of mixtures of fluorine containing polymers and non-fluorine containing polymers (i.e. free of non-vinylic fluorine) as water and oil repellents for textiles, paper, leather and the like.

Although fluorine containing polymers are readily available, it is well known that they are somewhat expensive. Their expense has been the primary reason for their lack of widespread commercial acceptance.

It is, therefore, an object of this invention to provide novel water and oil repellent compositions for textiles, leather, paper and the like which compositions consist of mixtures of fluorine containing compounds and non-fluorine containing compounds (i.e. free of non-vinylic fluorine) where the latter type forms a major proportion of the mixture. It is a further object to provide such compositions which are stable to heat and light, non-discoloring, durable on substrates and in latex form. Another object is to provide a process for treating textiles, paper, leather and the like with these compositions to render them oil and water repellent.

These and other objects will become apparent in the following description and claims.

More specifically, the present invention is directed to a polymeric product comprising (1) from about 3% to about 25%, by weight, of a polymer prepared from at least one polymerizable fluorine containing aliphatic compound of the structure $CH_2=CR^1Q$ and (2) from about 75% to about 97%, by weight, of a polymer prepared from at least one polymerizable vinyl compound $CH_2=CAB$ chosen from the group consisting of

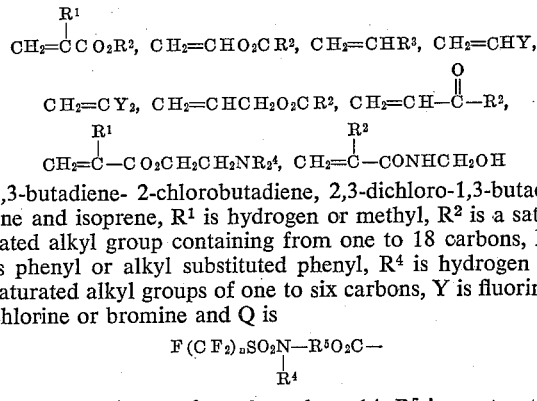

1,3-butadiene- 2-chlorobutadiene, 2,3-dichloro-1,3-butadiene and isoprene, $R^1$ is hydrogen or methyl, $R^2$ is a saturated alkyl group containing from one to 18 carbons, $R^3$ is phenyl or alkyl substituted phenyl, $R^4$ is hydrogen or saturated alkyl groups of one to six carbons, Y is fluorine, chlorine or bromine and Q is $$F(CF_2)_nSO_2N-R^5O_2C-$$
$$\qquad\qquad |$$
$$\qquad\qquad R^4$$

and, $n$ is an integer from 3 to about 14, $R^5$ is a saturated alkylene group containing from 2 to 12 carbons.

The present invention also includes a water dispersion or latex of this composition and fabrics or paper treated with this composition to render them water repellent.

Another embodiment of this invention is a polymeric composition which is a mixture of (a) at least one copolymer comprising from about 25% to about 99% by weight of at least one polymerizable fluorine containing compound

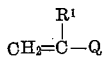

as heretofore described, and from 1% to about 75% by weight of at least one polymerizable vinyl compound $CH_2=CAB$, as heretofore described, and (b) a polymer prepared from at least one polymerizable vinyl compound $CH_2=CAB$, the weight proportion of said copolymer and said vinyl polymer being such that the mixture contains at least 3% by weight of the component $CH_2=CR^1Q$. This invention also encompasses a water dispersion or latex of said composition and fabrics or paper treated with said composition to render them oil and water repellent.

The instant invention includes a process for treating fibrous materials for the purpose of imparting oil and water repellency thereto which process comprises impregnating said fibrous materials with an aqueous bath containing from about 0.3 to about 10% by weight of a composition as heretofore described and, by any convenient means, expressing the excess liquid therefrom to effect a dry pick-up of between 0.3 and 10% on weight of fabric of total solids, said pick-up being equivalent to at least about 0.03% on weight of fabric of the fluorinated monomer, and heating the expressed material at from about 165° C. to about 195° C. for at least 15 seconds.

The preparation of the compounds

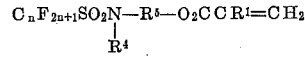

is fully described in U.S. Patent 2,803,615. Typical representative examples include:

2-(N-methylperfluorooctylsulfonamido)ethyl acrylate and methacrylate 2-(N-ethylperfluorooctylsulfonamido)ethyl acrylate and methacrylate 2-(N-n-propylperfluorooctylsulfonamido)ethyl acrylate and methacrylate the latter being the preferred species.

The fluorine containing monomers $CH_2=CR^1Q$, as described herein contain a polyfluoroalkyl group $F(CF_2)_n-$. As described, $n$ is from 3 to about 14. When $n$ is one or 2, good repellencies do not result. When $n$ is greater than about 14, the polymeric products become less useful since they serve no useful purpose over those containing 14 or less carbons.

The polymerizable vinyl compounds $CH_2=CAB$ which may be used according to the present invention include alkyl acrylates and methacrylates, vinyl esters of aliphatic acids, styrene and alkyl styrenes, vinyl halides, vinylidine halides, allyl esters, vinyl alkyl ketones, certain acrylamides and 1,3-butadiene and its derivatives. Typical representative examples include:

Methyl acrylate and methacrylate
Propyl acrylate and methacrylate
Butyl acrylate and methacrylate
Isoamyl acrylate and methacrylate
Octyl acrylate and methacrylate
2-ethylhexyl acrylate and methacrylate
Octadecyl acrylate and methacrylate
Lauryl acrylate and methacrylate
Cetyl acrylate and methacrylate
N,N-diethylaminoethyl methacrylate
Vinyl acetate, vinyl propionate, vinyl caprylate, vinyl laurate and vinyl stearate
Styrene, α-methylstyrene, p-methyl styrene
Vinyl fluoride, vinyl chloride, vinyl bromide, vinylidene fluoride, vinylidene chloride
Allyl heptanoate, allyl acetate, allyl caprylate, allyl caproate
Vinyl methyl ketone, vinyl ethyl ketone
1,3-butadiene, 2-chloro-1,3-butadiene, 2,3-dichloro-1,3-butadiene, isoprene
N-methylol acrylamide
N-methylol methacrylamide The preferred class is alkyl methacrylates. It is often preferable to include a small amount of N-methylol acrylamide as a copolymer with the alkyl methacrylates since durability is increased thereby. The preferred alkyl methacrylates are n-butyl, n-amyl, isoamyl, n-hexyl, n-heptyl, 2-ethylhexyl and n-octyl methacrylates. Styrene, 2,3-dichloro-1,3-butadiene and alkyl acrylates are also quite useful in the present invention but generally less preferable than the methacrylates.

Esters of acrylic and methacrylic acid are well known and, in many cases, commercially available materials, e.g., methyl, ethyl, butyl, 2-ethylhexyl acrylates and methyl, ethyl, butyl, isobutyl, hexyl, octyl, decyl, lauryl, stearyl, N,N-diethylaminoethyl methacrylates. All are readily prepared by esterification of the alcohol and acid in the presence of an acid catalyst.

Vinyl acetate, vinyl 2-ethylhexanoate and vinyl stearate are commercially available. The others are readily prepared by reaction of vinyl acetate with the desired acid in the presence of mineral acid or by reaction of the desired acid with acetylene in the presence of a catalyst.

Styrene, alkyl styrenes, butadiene, chlorobutadiene, dichlorobutadiene and isoprene are well known, commercially available compounds. Vinyl and vinylidene halides are also well known and commercially available. Allyl esters are also well known and many are commercially available, e.g., allyl caproate, allyl caprylate, allyl heptanoate, allyl isovalerate and allyl propionate. Methyl vinyl ketone is well known and commercially available. Other alkyl vinyl ketones may be prepared by the reaction of methyl alkyl ketones with formaldehyde in the presence of sulfuric acid. Methylol acrylamide is also commercially available.

The water and oil repellent compositions of the present invention comprise a mixture of a fluorine containing polymer and a nonfluorine containing polymer (i.e. free of non-vinylic fluorine). The fluorine containing polymer may consist of one or more fluorine containing monomers or of one or more of the fluorine containing monomer copolymerized with a nonfluorine containing monomer (i.e. free of non-vinylic fluorine). In the latter case, the polymer consists of 25% to about 99% by weight of the fluorine contained monomers. If the fluorine containing polymer contains less than about 25% by weight of the fluorine containing monomer, poor repellencies (or no repellency) are obtained.

The nonfluorine containing polymer is prepared from one or more of the nonfluorine containing monomers previously described.

It is necessary that the polymer mixture obtain at least 3% by weight of the monomer $CH_2=CR^1Q$. At lower concentrations unsatisfactory repellencies are obtained. The upper limit of 25% placed on $CH_2=CR^1Q$ is determined by economic considerations.

There is a distinct advantage obtained when a small amount of either N-methylol acrylamide is included in either the fluorinated or nonfluorinated polymer (or both). The advantage is that the compositions thus obtained are more durable on fabrics than those which do not contain these compounds.

The molecular weight of both the fluorinated and nonfluorinated polymers is not a controlling factor as useful repellants are obtained over a wide range of molecular weights of both types of polymers.

It should be noted that the fluorine containing monomers defined do not have fluorine attached to the carbon atoms of the polymerizable vinyl group but only in the groups attached to the vinyl group. For the purposes of this invention, monomers containing fluorine attached only to the carbons of the vinyl group (e.g., vinyl fluoride and vinylidene fluoride) are not considered to be fluorine containing monomers.

In the practice of this invention, the fluorine containing monomer and the nonfluorine containig monomer are polymerized separately, generally by an emulsion polymerization technique. The latexes of the fluorine containing polymer and nonfluorine containing polymer are then mixed together in the desired proportions and applied to the substrate. The fluorinated and nonfluorinated monomers may be copolymerized and resulting latex mixed with a nonfluorinated polymer latex in the desired proportions.

In general, the compositions of this invention may be prepared by any of the known techniques for emulsion polymerization of vinyl compounds. The process will be carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include benzoyl peroxide, lauroyl peroxide, tert-butyl perbenzoate, 1-hydroxycyclohexyl hydroperoxide, tert-butyl peroxide, tert-butyl hydroperoxide, 3-carboxypropionyl peroxide, acetyl peroxide, 2,2'-azodiisobutyramidine dihydrochloride, 2,2'-azodiisobutyronitrile, 2,2'-azobis (2,4-dimethyl - 4-methoxyvaleronitrile), sodium peroxide, barium peroxide, hydrogen peroxide, ammonium persulfate, potassium persulfate and the like. The concentration of the catalyst for the polymerization is usually between 0.01% and 2% based on the weight of the monomers.

The surface active agents employed to stabilize the emulsion during its makeup and polymerization are anionic, cationic, or non-ionic emulsifying agents, but preferably they are the cationic or non-ionic type. Representative anionic emulsifying agents are alkyl ($C_{10}$ to $C_{18}$) sodium sulfate, sodium alkyl ($C_{12}$ to $C_{18}$) benzenesulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium $\omega$-H-polyfluoroalkanoate ($C_8$ to $C_{10}$), ammonium perfluoroalkanoate. The cationic agents that may be employed include dodecyltrimethylammonium acetate, trimethyltetradecylammonium chloride, hexadecyltrimethylammonium bromide, trimethyloctadecylammonium chloride, (dodecylmethylbenzyl)-trimethylammonium chloride, benzyldodecyldimethylammonium chloride, N-[2-(diethylamino)ethyl]oleamide hydrochloride.

Non-ionic surface active agents that may be employed include condensation products of ethylene oxide with hexylphenol, isooctylphenol, hexadecanol, oleic acid, alkane ($C_{12}$–$C_{16}$) thiol, alkyl ($C_{12}$–$C_{18}$) amines and the like. In addition, small amounts of chain transfer agents may be present during the polymerization, such as, for example, an alkanethiol of 4 to 12 carbon atoms.

Suitable substrates for the application of the compositions of this invention are films, fibers, yarns, fabrics, and articles made from filaments, fibers, or yarns derived from natural, modified natural, or synthetic polymeric materials or from blends of these. Specific examples are cotton, silk, regenerated cellulose, nylon, fiber-forming linear polyesters, fiber-forming polyacrylonitrile, cellulose nitrate, cellulose acetate, ethyl cellulose, paper, fiber glass and the like. Dyed and undyed cotton sateen, poplin, broadcloth, jean cloth, gabardine and the like are especially adaptable for treatment with the compositions of this invention to provide products having a high repellency to oil and water and being relatively unaffected by the action of heat and light. Materials rendered oil and water repellent by the herein described and claimed polymer compositions retain a portion of the original repellent when laundered and dry cleaned.

The compositions of the present invention are applied preferably as an aqueous dispersion by brushing, dipping, spraying, padding, roll-coating or by any combination of these methods. For example, the prepared concentrated dispersion of polymer composition may be used as a pad bath by diluting it with water to a solids content of 0.3% to 10% by weight of the bath. The textile material, or paper if desired, is padded in this bath, and is then freed of excess liquid, usually by squeeze rolls, so that the dry pick-up (weight of the dry polymer on fiber) is between about 0.3% and 10% by weight of the fiber. The treated material is then heated at 165° to 195° C. for at least about 15 seconds to impart maximum durability of the agent on the material. The resulting textile material or paper will be found to be resistant to water and oil, and the textile material will retain its resistance to such agents even after many launderings and dry cleanings. The polymers may, if desired, be dispersed in liquids other than water.

Other methods for applying the present novel compositions include the use of solutions in place of dispersions and stepwise deposition of the two polymers. Application from solution is carried out in the same ways, in general, as the application of dispersions. Stepwise application involves deposition of the two polymers separately, usually the nonfluorinated polymer first. Each polymer may be applied either as a dispersion or solution by any of the means described and a curing step may be used after both steps, if desired. The cure after the second application is necessary.

Representative examples illustrating the present invention follow. All parts are by weight.

EXAMPLE I

A vessel equipped with an agitator, thermometer and reflux condenser was charged with the following ingredients in the order given:

| | Parts |
|---|---|
| Water | 30 |
| Trimethyloctadecyl ammonium bromide | 1 |
| 2-(N-n-propylperfluorooctylsulfonamido) ethyl acrylate | 10 |
| Acetone | 1 |
| 2,2'-azobisisobutyramidine dihydrochloride | 0.2 |

The water ammonium salt, methacrylate mixture was purged with nitrogen before addition of acetone and catalyst.

The monomer readily emulsified in the water solution. The charge was heated at 65° C. for six hours under a mild flow of nitrogen. The solids content of the resulting latex was 21.3%.

Essentially the same procedure is used to prepare the polymers (fluorinated and nonfluorinated) described and used in the following examples as well as the useful fluorinated and nonfluorinated monomers previously listed.

EXAMPLE II

Latexes of poly(2 - (N - n - propylperfluorooctylsulfonamido)ethyl acrylate) and poly(n-octyl methacrylate) were mixed and diluted in several proportions to obtain latex containing several concentrations of total solids with several percentage concentrations of fluorinated polymer each. Samples of cotton poplin fabric were then padded with the various latexes to obtain 100% wet pick-up. The samples were then air dried for at least 45 minutes, then oven cured for 2 to 3 minutes at 175° C.

The samples were tested for water repellency according to AATCC Standard Test Method 22–1952 of the American Association of Textile Chemists and Colourists. A rating of 100 indicates no water penetration or surface adhesion. A rating of 90 denotes slight random sticking or wetting on the fabric. A rating of 50 is still somewhat water repellent while a rating of zero indicates complete penetration and wetting.

Oil repellency is tested by placing a drop of the test mixture gently on the surface of the treated fabric sample on a flat, horizontal surface. After two minutes, penetration or wicking into the fabric is observed visually. The test solutions have the compositions shown below in Table I and contain a small amount of oil soluble blue dye for sake of visibility. The oil repellency rating is the highest number test solution which does not penetrate the fabric, e.g., if the fabric is penetrated by No. 7 solution but not by No. 1–6, the rating is 6. A fabric penetrated by No. 1 solution is rated as zero.

Obviously the higher the number, the greater resistance to oil penetration. Any repellency greater than zero will repel most oils.

*Table I*

| Oil Repellency Rating | Solution | Surface Tension, dynes/cm. at 25° C. |
|---|---|---|
| 9 | n-Hexane | 19.2 |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 50-50 hexadecane-Nujol | 28.7 |
| 1 | Nujol | 31.2 |

The results obtained with this series of Table I tests follow:

| | Fluorinated Polymer Monomer | Nonfluorinated Polymer Monomer(s) | Loading, Percent OWF [a] |
|---|---|---|---|
| (1) | $C_8F_{17}SO_2NCH_2CH_2OCCH=CH_2$ $\mid$ $nC_3H_7$ | $CH_2=CClCH=CH_2$ | 3, 1 |
| (2) | $C_8F_{17}SO_2NCH_2CH_2O_2CCH=CH_2$ $\mid$ $nC_3H_7$ | $C_8H_{17}O_2CC(CH_3)=CH_2$ | 3, 1 |

| | Percent Fluorinated Polymer OWPS [b] Repellency | | | | | | | | |
|---|---|---|---|---|---|---|---|---|---|
| | 20 | | 15 | | 10 | | 7 | | 5 |
| | Oil | Water | Oil | Water | Oil | Water | Oil | Water | Oil | Water |
| (1) | 5 / 1 | 90 / 50 | 5 / 1 | 70 / 50 | 4 / 1 | 70 / 50 | 4 / 1 | 50 / 0 | 1 / 1 | 50 / 0 |
| (2) | 6 / 1 | 70 / 50 | 6 / 1 | 70 / 50 | 6 / 1 | 70 / 50 | 6 / 1 | 70 / 50 | 3 / 1 | 50 / 0 |

[a] OWF=On weight of fabric.
[b] OWPS=On weight of polymer solids.

It is understood that the preceding representative examples may be varied within the scope of the present specification, both as to reactants and reaction conditions, by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polymeric product comprising (1) from about 3% to about 25%, by weight, of a polymer prepared from at least one polymerizable fluorine containing aliphatic compound of the structure $CH_2=CR^1Q$ and (2) from about 75% to about 97%, by weight, of a polymer prepared from at least one polymerizable vinyl compound $CH_2=CAB$ chosen from the group consisting of

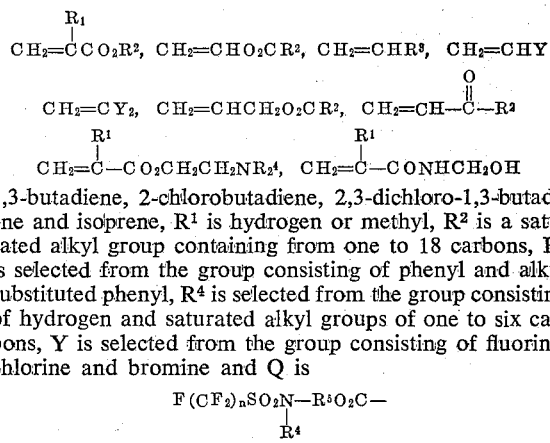

1,3-butadiene, 2-chlorobutadiene, 2,3-dichloro-1,3-butadiene and isoprene, $R^1$ is hydrogen or methyl, $R^2$ is a saturated alkyl group containing from one to 18 carbons, $R^3$ is selected from the group consisting of phenyl and alkyl substituted phenyl, $R^4$ is selected from the group consisting of hydrogen and saturated alkyl groups of one to six carbons, Y is selected from the group consisting of fluorine, chlorine and bromine and Q is

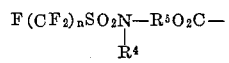

and, $n$ is an integer from 3 to about 14, $R^5$ is a saturated alkylene group containing from 2 to 12 carbons.

2. A water dispersion of a composition according to claim 1.

3. A process for treating fibrous materials for the purpose of imparting oil and water repellency thereto which process comprises impregnating said fibrous materials with an aqueous bath containing from about 0.3 to about 10% by weight of a composition according to claim 1 and, by any convenient means, expressing the excess liquid therefrom to effect a dry pick-up of between 0.3 and 10% on weight of fabric of total solids, said pick-up being equivalent to at least about 0.03% on weight of fabric of the fluorinated monomer, and heating the expressed material at from about 165° C. to about 195° C. for at least 15 seconds.

4. A polymeric composition which is a mixture of (a) at least one copolymer comprising from about 25% to about 99% by weight of at least one polymerizable fluorine containing compound

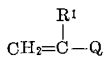

and from 1% to about 75% by weight of at least one polymerizable vinyl compound $CH_2=CAB$, chosen from the group consisting of

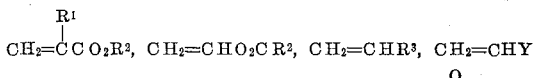
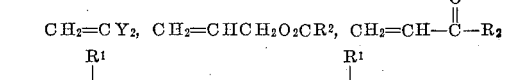

1,3-butadiene, 2-chlorobutadiene, 2,3-dichloro-1,3-butadiene and isoprene and, (b) a polymer prepared from at least one polymerizable vinyl compound $CH_2=CAB$, the weight proportion of said copolymer and said vinyl polymer being such that the mixture contains at least 3% by weight of the component $CH_2=CR^1Q$, $R^1$ is selected from the group consisting of hydrogen and methyl, $R^2$ is a saturated alkyl group containing from one to 18 carbons, $R^3$ is selected from the group consisting of phenyl and alkyl substituted phenyl, $R^4$ is selected from the group consisting of hydrogen and saturated alkyl groups of one to six carbons, Y is selected from the group consisting of fluorine, chlorine and bromine and Q is

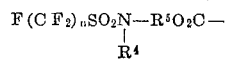

and, $n$ is an integer from 3 to about 14, $R^5$ is a saturated alkylene group containing from 2 to 12 carbons.

5. A water dispersion of a composition according to claim 4.

References Cited by the Examiner

UNITED STATES PATENTS

| | | | |
|---|---|---|---|
| 2,318,429 | 5/1943 | Smith | 117—135.5 |
| 2,681,324 | 6/1954 | Hochberg | 260—29.6 |
| 2,803,615 | 8/1957 | Ahlbrecht et al. | 260—29.6 |
| 2,840,442 | 6/1958 | Abrams et al. | 117—139.5 |

MURRAY TILLMAN, *Primary Examiner.*

LEON J. BERCOVITZ, *Examiner.*

H. SATZ, W. J. BRIGGS, Sr., *Assistant Examiners.*